United States Patent  
Naidu et al.

(10) Patent No.: US 6,566,829 B1  
(45) Date of Patent: May 20, 2003

(54) METHOD AND APPARATUS FOR TORQUE CONTROL OF A MACHINE

(75) Inventors: Malakondaiah Naidu, Troy; Rassem Ragheb Henry, Clinton Township; Thomas Wolfgang Nehl, Shelby Township, all of MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/656,903

(22) Filed: Sep. 7, 2000

(51) Int. Cl.[7] .................................................. H02P 7/00
(52) U.S. Cl. ..................... 318/432; 318/459; 318/721; 318/811; 180/204; 701/41
(58) Field of Search ....................... 318/717, 718, 318/721, 801–811, 459, 432; 180/421, 422, 443, 446; 701/41, 42

(56) References Cited

U.S. PATENT DOCUMENTS

| 3,898,544 A | 8/1975 | Tanikoshi ................... 318/254 |
| 3,919,609 A | 11/1975 | Klautschek et al. ........ 318/227 |
| 4,027,213 A | 5/1977 | de Valroger ............... 318/138 |
| 4,135,120 A | 1/1979 | Hoshimi et al. ............ 318/138 |
| 4,217,508 A | 8/1980 | Uzuka .......................... 310/46 |
| 4,240,020 A | 12/1980 | Okuyama et al. ........... 318/721 |
| 4,392,094 A | 7/1983 | Kuhnlein .................... 318/254 |
| 4,447,771 A | 5/1984 | Whited ......................... 18/661 |
| 4,511,827 A | 4/1985 | Morinaga et al. ........... 318/254 |
| 4,556,811 A | 12/1985 | Hendricks .................. 310/266 |
| 4,558,265 A | 12/1985 | Hayashida et al. ......... 318/561 |
| 4,633,157 A | 12/1986 | Streater ...................... 318/723 |
| 4,686,437 A | 8/1987 | Langley et al. ............. 318/254 |
| 4,688,655 A | 8/1987 | Shimizu .................... 180/79.1 |
| 4,745,984 A | 5/1988 | Shimizu .................... 180/79.1 |
| 4,814,677 A | 3/1989 | Plunkett ..................... 318/254 |
| 4,835,448 A | 5/1989 | Dishner ...................... 318/254 |
| 4,837,692 A | * 6/1989 | Shimizu ................. 364/424.05 |
| 4,868,477 A | 9/1989 | Anderson et al. ........... 318/696 |
| 4,868,970 A | 9/1989 | Schultz et al. ................ 29/596 |
| 4,882,524 A | 11/1989 | Lee ............................. 318/254 |
| 4,912,379 A | 3/1990 | Matsuda et al. ............ 318/254 |
| 4,988,273 A | 1/1991 | Faig et al. .................. 425/145 |
| 4,991,676 A | * 2/1991 | Morishita .................. 180/79.1 |
| 4,992,717 A | 2/1991 | Marwin et al. ............. 318/696 |
| 5,006,774 A | 4/1991 | Rees .......................... 318/721 |

(List continued on next page.)

Primary Examiner—Robert E. Nappi  
Assistant Examiner—Rina I. Duda

(57) ABSTRACT

An exemplary embodiment of the invention is a method for torque control of a PM synchronous machine. The method includes obtaining a torque command signal and a machine speed and determining an operating mode in response to the torque command signal and the machine speed. The operating mode includes a first operating mode and a second operating mode. In the first operating mode, a stator phase voltage magnitude is computed and an angle between the stator phase voltage and a stator phase back emf is determined in response to the stator phase voltage magnitude. In the second operating mode, the stator phase voltage is set to a predetermined magnitude and the angle between the stator phase voltage and the stator phase back emf is determined in response to the predetermined magnitude.

16 Claims, 3 Drawing Sheets

U.S. PATENT DOCUMENTS

| | | | |
|---|---|---|---|
| 5,040,629 A | 8/1991 | Matsuoka et al. | 180/79.1 |
| 5,063,011 A | 11/1991 | Rutz et al. | 264/126 |
| 5,069,972 A | 12/1991 | Versic | 428/407 |
| 5,076,381 A | 12/1991 | Daido et al. | 180/79.1 |
| 5,122,719 A | 6/1992 | Bessenyei et al. | 318/629 |
| 5,223,775 A | 6/1993 | Mongeau | 318/432 |
| 5,239,490 A | 8/1993 | Masaki et al. | 364/565 |
| 5,331,245 A | 7/1994 | Burgbacher et al. | 310/186 |
| 5,345,156 A | 9/1994 | Moreira | 318/254 |
| 5,349,278 A | 9/1994 | Wedeen | 318/632 |
| 5,361,210 A | 11/1994 | Fu | 364/424.05 |
| 5,428,285 A | 6/1995 | Koyama et al. | 318/799 |
| 5,433,541 A | 7/1995 | Hieda et al. | 400/279 |
| 5,444,341 A | 8/1995 | Kneifel, II et al. | 318/432 |
| 5,460,235 A | 10/1995 | Shimizu | 180/79.1 |
| 5,461,293 A | 10/1995 | Rozman et al. | 318/603 |
| 5,467,275 A | 11/1995 | Takamoto et al. | 364/426.01 |
| 5,469,215 A | 11/1995 | Nahiki | 318/432 |
| 5,475,289 A | 12/1995 | McLaughlin et al. | 318/432 |
| 5,493,200 A | 2/1996 | Rozman et al. | 322/10 |
| 5,517,415 A | 5/1996 | Miller et al. | 364/424.05 |
| 5,554,913 A | 9/1996 | Ohaswa | 318/434 |
| 5,563,790 A * | 10/1996 | Wada et al. | 364/424.05 |
| 5,568,389 A | 10/1996 | McLaughlin et al. | 364/424.05 |
| 5,569,994 A | 10/1996 | Taylor et al. | 318/700 |
| 5,579,188 A | 11/1996 | Dunfield et al. | 360/99.08 |
| 5,585,708 A | 12/1996 | Richardson et al. | 318/800 |
| 5,608,300 A * | 3/1997 | Kawabata et al. | 318/721 |
| 5,616,999 A | 4/1997 | Matsumura et al. | 318/632 |
| 5,623,409 A | 4/1997 | Miller | 364/424.051 |
| 5,642,044 A | 6/1997 | Weber | 324/207.25 |
| 5,656,911 A | 8/1997 | Nakayama et al. | 318/718 |
| 5,659,472 A * | 8/1997 | Nishino et al. | 364/424.051 |
| 5,668,721 A | 9/1997 | Chandy | 701/41 |
| 5,672,944 A | 9/1997 | Gokhale et al. | 318/254 |
| 5,701,065 A | 12/1997 | Ishizaki | 318/701 |
| 5,739,650 A | 4/1998 | Kimura et al. | 318/254 |
| 5,777,449 A | 7/1998 | Schlager | 318/459 |
| 5,780,986 A | 7/1998 | Shelton et al. | 318/432 |
| 5,787,376 A * | 7/1998 | Nishino et al. | 701/41 |
| 5,801,509 A * | 9/1998 | Sawa et al. | 318/705 |
| 5,803,197 A | 9/1998 | Hara et al. | 180/248 |
| 5,811,905 A | 9/1998 | Tang | 310/179 |
| 5,852,355 A | 12/1998 | Turner | 318/701 |
| 5,881,836 A | 3/1999 | Nishimoto et al. | 180/446 |
| 5,898,990 A | 5/1999 | Henry | 29/598 |
| 5,919,241 A | 7/1999 | Bolourchi et al. | 701/41 |
| 5,920,161 A | 7/1999 | Obara et al. | 318/139 |
| 5,929,590 A | 7/1999 | Tang | 318/701 |
| 5,962,999 A | 10/1999 | Nakamura et al. | 318/432 |
| 5,963,706 A | 10/1999 | Baik | 388/804 |
| 5,977,740 A | 11/1999 | McCann | 318/701 |
| 5,984,042 A | 11/1999 | Nishimoto et al. | 180/446 |
| 5,992,556 A | 11/1999 | Miller | 180/446 |
| 6,002,226 A | 12/1999 | Collier-Hallman et al. | 318/439 |
| 6,002,234 A * | 12/1999 | Ohm et al. | 318/729 |
| 6,009,003 A | 12/1999 | Yeo | 363/37 |
| 6,016,042 A * | 1/2000 | Miura et al. | 318/430 |
| 6,034,460 A | 3/2000 | Tajima | 310/179 |
| 6,034,493 A | 3/2000 | Boyd et al. | 318/254 |
| 6,043,624 A | 3/2000 | Masaki et al. | 318/723 |
| 6,049,182 A | 4/2000 | Nakatani et al. | 318/432 |
| 6,129,172 A | 10/2000 | Yoshida et al. | 180/446 |
| 6,246,197 B1 * | 6/2001 | Kurishige et al. | 318/432 |

* cited by examiner

METHOD AND APPARATUS FOR TORQUE CONTROL OF A MACHINE

TECHNICAL FIELD

The invention relates generally to torque control of a machine, and in particular to torque control of permanent magnet (PM) synchronous machines used in electric power steering systems.

BACKGROUND OF THE INVENTION

PM synchronous motors are attractive as servo drives because of their high power densities. The stator phases of such motors may be electrically excited to produce a controlled torque on the rotor, the torque being proportional to the field intensity of the rotor magnets and the amplitude of the stator phase excitation, thus permitting control of the rotor motion. When such motors are employed for high performance servo drive applications, which require precise control of rotor motion, feedback signals representing rotor position and rotor velocity are used. These feedback sensors are often generated using current sensors connected to phase windings of a PM synchronous motor to achieve effective torque control. An exemplary system using current sensors for rotor position control is described in U.S. Pat. No. 5,569,994. The use of current sensors, however, adds expense to the overall system and tends to cause low frequency torque ripple. Accordingly, there is a need in the art for a method and system for providing torque control without the use of current sensors coupled to the phase windings.

SUMMARY OF THE INVENTION

An exemplary embodiment of the invention is a method for torque control of a PM synchronous machine. The method includes obtaining a torque command signal and a machine speed and determining an operating mode in response to the torque command signal and the machine speed. The operating mode includes a first operating mode and a second operating mode. In the first operating mode, a stator phase voltage magnitude is computed and an angle between the stator phase voltage and a stator phase back emf is determined in response to the stator phase voltage magnitude. In the second operating mode, the stator phase voltage is set to a predetermined magnitude and the angle between the stator phase voltage and the stator phase back emf is determined in response to the predetermined magnitude.

BRIEF DESCRIPTION OF THE DRAWINGS

The invention will be further described, by way of example, with reference to the accompanying drawings in which.

DESCRIPTION OF AN EMBODIMENT OF THE INVENTION

An exemplary embodiment of the invention is a method for controlling the torque of a PM machine in a first mode below the base speed and in a second mode above the base speed without the use of current sensors. In an exemplary embodiment, the machine is a motor. In this method, the machine phase voltages and their angles with respect to their back emfs are determined based on measured speed and known machine parameters. These voltages are fed to the machine by means of a PWM inverter at an optimum computed angle with respect to their back emfs to obtain required torque. This controller mimics the performance of a conventional current controller without low frequency torque ripple otherwise caused by current sensors due to the dc off-set.

Figure 1:
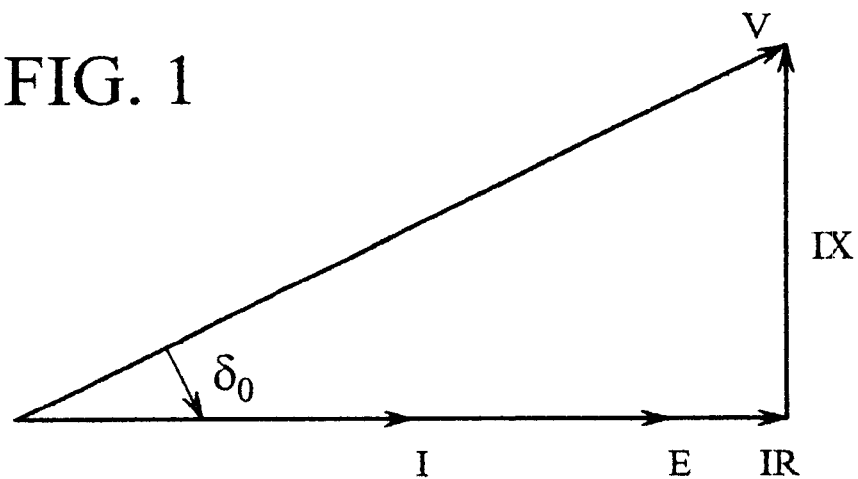
FIG. 1 illustrates torque control below the base speed in the voltage mode.
Figure 2:
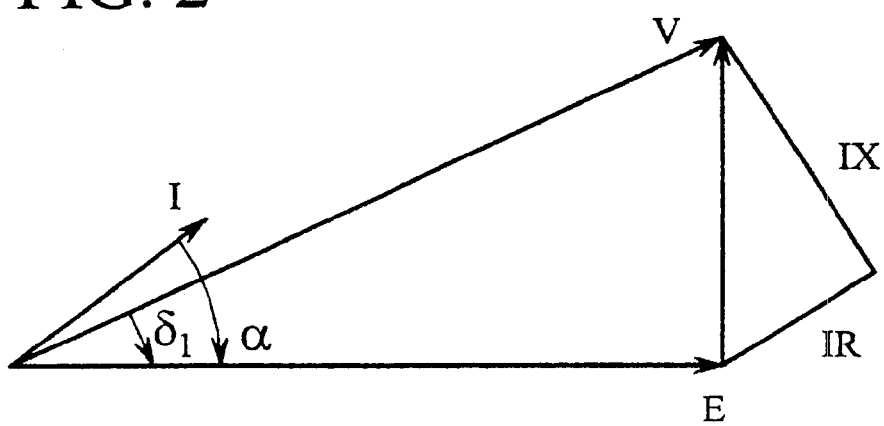
FIG. 2 illustrates torque control above the base speed in the voltage mode.

The exemplary embodiment of the invention is applicable in two running modes of a PM synchronous machine. The first mode (referred to as a constant torque mode) is below a base speed where the back emf is less than the battery voltage. Based on known machine parameters and the speed, computed voltages are impressed across the machine terminals at an optimum angle such that the stator phase currents are co-phasal with their respective back emfs to produce maximum torque per ampere. This mode is shown in FIG. 1 and described in further detail herein. The second mode is above the base speed (referred to as extended mode) where the back emfs exceed the battery voltage. For a given torque command, the required computed voltages are impressed at the machine terminals at an optimum computed angle with respect to their back emfs. In the second mode, the phase current leads the back emf thereby reducing the air gap flux and producing the required torque. This mode is shown in FIG. 2 and described in further detail herein. The speed ranges defining the first mode and the second mode depends upon the inductance of the machine.

Control in the first mode will now be described with reference to FIG. 1. The variables shown in FIGS. 1 and 2 are as follows:

E=the stator phase back emf
V=the stator phase terminal voltage
I=the stator phase current
R=the stator resistance
$X=\omega_e L_a$, the stator phase reactance
$\omega_e$=the electrical angular frequency, in rad/s
$L_a$=the stator phase inductance
$\delta$=the load angle between the phase back emf and the terminal voltage
$\alpha$=the angle between phase back emf and current.

In order to optimize the drive performance in the constant torque mode below the base speed, the phase voltages are impressed across the machine terminals at an angle $\delta_0$ such that the phase currents I are in phase with the respective back emf E for maximum torque per ampere, as shown in FIG. 1.

The electromagnetic torque produced by the machine is given as $$T_e = 3K_e I \qquad (1)$$

where, $K_e = E/\omega_m$ = back emf constant.

The terminal phase voltage is given as $$V^2 = (E+IR)^2 + (IX)^2 \qquad (2)$$

For a given torque command $T_{cmd}$, (neglecting friction losses) substituting (1) in to (2), the terminal voltage is expressed in terms of machine parameters and the measured speed as $$V^2 = \{(K_e \omega_m + K_1 T_{cmd})^2 + K_2(T_{cmd}\omega_m)^2\} \qquad (3)$$

Where, $$K_1 = R/(3K_e) \quad (4)$$

$$K_2 = \{(PL_a)/(3K_e)\}^2 \quad (5)$$

P=number of poles $\omega_m = P\omega_e$ = mechanical angular frequency, rad/s $T_{cmd}$ is the torque required of the motor by the system, i.e., power steering system. V can be obtained from a $V^2$ vs V lookup table to minimize the computational time. The angle $\delta_0$ is computed in terms of known parameters as $$\sin \delta_0 = (T_{cmd}\omega_m K_3/V) \quad (6)$$

Where, $$K_3 = (PL_a/6K_e) \quad (7)$$

The required phase voltages for a given torque command are given as $$V_a = V \sin(\delta_0 + \theta) \quad (8)$$

$$V_b = V \sin(\delta_0 + \theta + 240) \quad (9)$$

$$V_c = V \sin(\delta_0 + \theta + 120) \quad (10)$$

These voltages are impressed across the machine by a driver such as a PWM inverter as described below with reference to FIG. 3.

Operation in the second mode, above the base speed as shown in FIG. 2, will now be described. To operate above the base speed, for a given torque command the maximum available phase voltages are impressed across the machine terminals at an angle $\delta_1$ computed from the known parameters. Under this condition the phase current leads the back emf and its demagnetizing component reduces the air gap flux such that the machine produces the required torque.

From FIG. 2, the angle between stator phase current I and the back emf E is calculated as $$\cos \alpha = \{R(V \cos \delta_1 - E) + V \times \sin \delta_1)\}/\{1(R^2 + X^2)\} \quad (11)$$

The electromagnetic torque under this condition is given as $$T_e = 3K_e I \cos \alpha \quad (12)$$

$T_{cmd}$ can be obtained as a function of load angle, $\delta_1$ using (11) and (12) as $$T_{cmd} = \{3K_e/(R^2 + X^2)\}\{(V_m \cos \delta_1 - K_e \omega_m)R + (XV_m \sin \delta_1)\} \quad (13)$$

Where, $V_m$ is the maximum available phase voltage of the PWM inverter. Since the torque command $T_{cmd}$ is the function of $\sin \delta_1$ and $\cos \delta_1$, the angle $\delta_1$ is computed by an iteration method until the condition defined in equation (13) is satisfied. The maximum available voltages are impressed across the machine terminals by mean of PWM inverter at an angle $\delta_1$ with respect to the back emfs to obtain the required torque. Frictional losses may be taken into account by defining $T_{cmd} = T_e + T_{friction}$.

Figure 3:
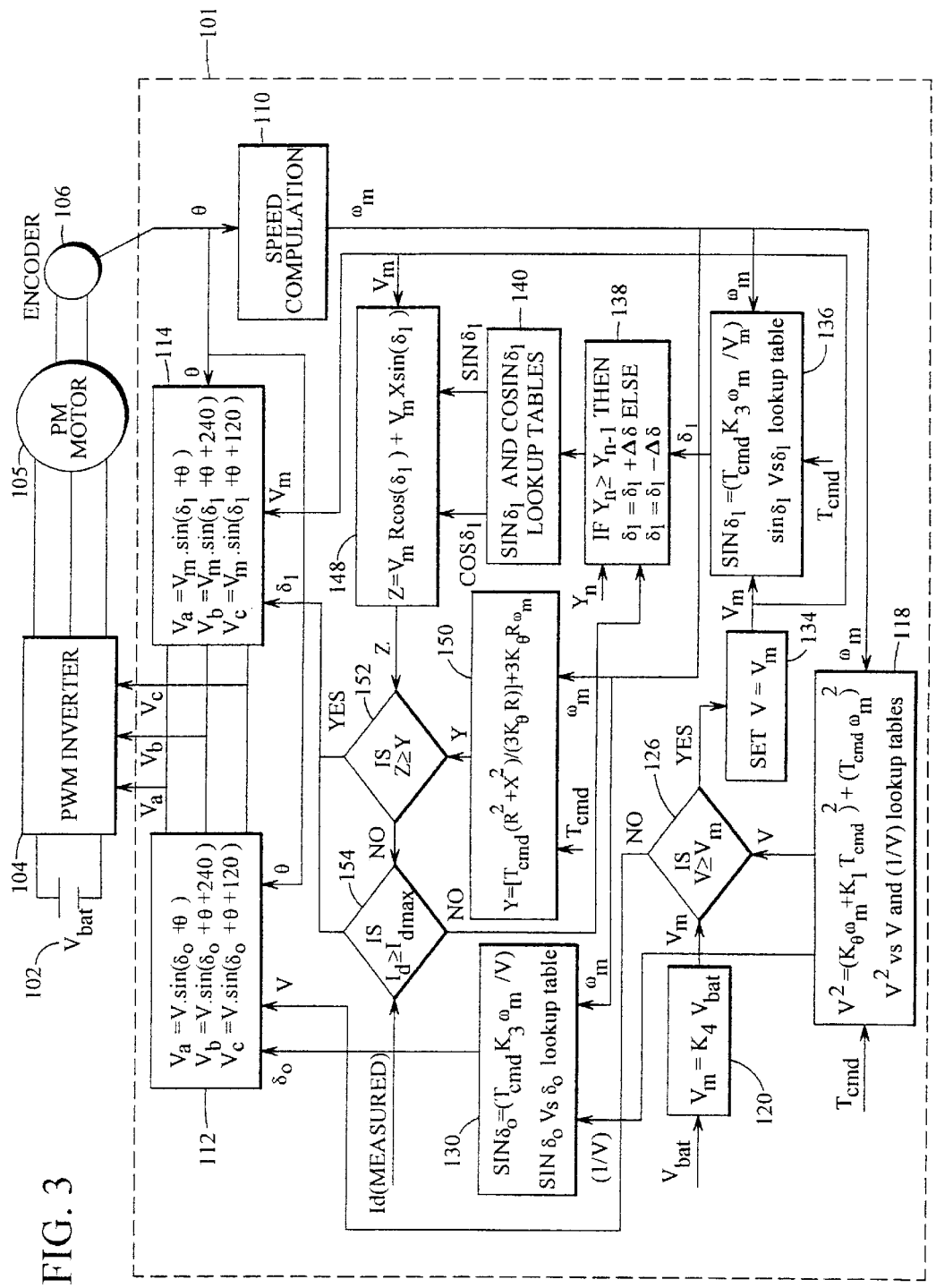
FIG. 3 is a flow diagram of an exemplary embodiment of the torque control system.

FIG. 3 is an exemplary block diagram of a control system for a permanent magnet synchronous machine in both the first and second modes. A three phase pulse width modulation (PWM) inverter 104 converts battery voltage from battery 102 to phase voltages and provides the phase voltages to the PM motor 105. An encoder 106 is coupled to the shaft of the PM motor 105 to measure the rotation angle $\theta$ of the PM motor 105. A controller shown as 101 receives the rotation angle $\theta$ and other inputs and generates phase voltages $V_a$, $V_b$ and $V_c$ as described herein. The controller 101 may be implemented using a microprocessor along with conventional associated components (e.g., memory, communications device, etc.). Components such as look up tables may be used in controller 101 as described herein. The steps performed by the controller 101 are shown in flowchart form within controller 101.

The rotation angle $\theta$ is used to provide a calculation of the mechanical angular frequency $\omega$ in radians/second at speed computation step 110. The stator phase voltage magnitude V is determined using the torque command signal $T_{cmd}$ requesting a torque from the PM motor and $\omega$ as inputs to calculate $V^2$. As shown at step 118, $V^2$ is equal to $$V^2 = \{(K_e\omega_m + K_1 T_{cmd})^2 + K_2(T_{cmd}\omega_m)^2\} \quad (3)$$

Where, $$K_1 = R/(3K_e) \quad (4)$$

$$K_2 = [(PL_a)/(3K_e)]^2 \quad (5)$$

V may be determined from $V^2$ by a look up table accessed at 118.

To determine whether the motor is to operate in the first mode or second mode, the voltage V determined at 118 is compared to a maximum inverter voltage $V_m$ that can be generated by inverter 104. The maximum inverter voltage $V_m$ is determined as $$V_m = K_4 V_{bat},$$

where $K_4$ is a constant and $V_{bat}$ is the battery voltage provided by battery 102.

At step 126, it is determined whether V is less than $V_m$. If not, the PM motor 105 is to operate in the first mode and flow proceeds to step 112 where the controller determines the three phase voltages based on V and angle $\delta_0$. A value designated 1/V derived at step 118 and $\omega$ are used at 130 to determine $\delta_0$ as follows:

$$\sin \delta_0 = (Pl_a/6K_e) = (T_{cmd} K_3 \omega_m/V), \text{ where } K_3 = (Pl_a/6K_e).$$

A look up table may be used to determine 1/V from V at step 118. A further look up table may be used to compute $\delta_0$ based on 1/V and $\omega$ at step 130. The values of $\theta$, $\delta_0$ and V are used at step 112 to determine phase voltages $V_a$, $V_b$, and $V_c$. The phase voltages $V_a$, $V_b$, and $V_c$ are coupled to the PWM inverter 104 for application to the PM motor 105.

If the $T_{cmd}$ signal input to step 118 generates a value V greater than $V_m$, this indicates the second mode of operation and decision element 126 directs flow to step 134 where V is set equal to $V_m$. Step 136 uses $V_m$, $T_{cmd}$ and $\omega_m$ to calculate $\sin \delta_1$.

$$\sin \delta_1 = (T_{cmd} K_3 \omega_m/V_m)$$

A lookup table may be used to determine the value of $\delta_1$ from $\sin \delta_1$.

Flow proceeds to step 138 where the angle $\delta_1$ may be adjusted based on an iterative loop described herein. On the initial determination of $\delta_1$, step 138 may be omitted. At step 140, $\cos \delta_1$ and $\sin \delta_1$ values are derived (e.g., by look up tables) and provides to step 148 where a computed torque value Z is determined based on the voltage $V_m$ and the angle $\delta_1$. Z represents a computed torque value at the angle $\delta_1$. A demanded torque value Y is calculated at step 150. The computed torque value Z and the demanded torque value Y are compared at step 152. If the computed torque value Z equals or exceeds the demanded torque value Y, then the angle $\delta_1$ is suitable to achieve the desired torque and flow proceeds to step 114 where phase voltages $V_a$, $V_b$, and $V_c$ are determined based on $\delta_1$ and $V_m$. The phase voltages $V_a$, $V_b$, and $V_c$ are coupled to the PWM inverter 104 for application to the PM motor 105.

If the computed torque value Z does not equal or exceed the demanded torque value Y at step 152, flow proceeds to step 154 where it is determined if the measured current $I_d$ is greater than or equal to a current limit $I_{dmax}$. The measured current $I_d$ may be provided from a current sensor located outside of the phase windings. If step 154 results in a yes, the system cannot increase the current and the existing angle $\delta_1$ is used at step 114 for computation of the phase voltages. If $I_d$ is less than $I_{dmax}$, flow proceeds to step 138 where the angle $\delta_1$ may be incremented or decremented as necessary. If the current demanded torque value $Y_n$ is greater than or equal to the prior demanded torque value $Y_{n-1}$, then the value of $\delta_1$ is incremented by $+\Delta\delta$. Alternatively, if $Y_n$ is less than $Y_{n-1}$, $\delta_1$ is decremented by $-\Delta\delta$ and flow proceeds to step 140 where the iterative process continues until either the demanded torque value Y is met or exceeded or the maximum current $I_{dmax}$ is reached.

Figure 4:
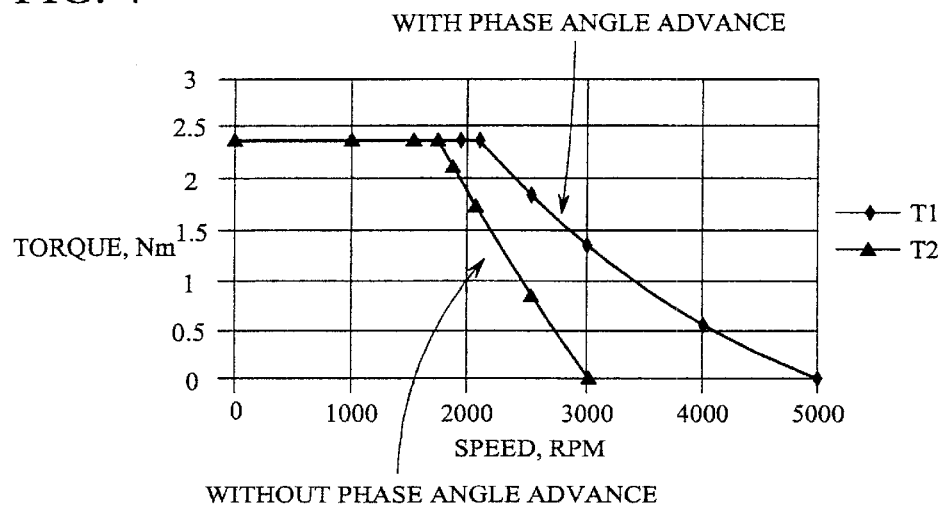
FIG. 4 illustrates torque vs. speed of a PM motor in voltage mode control.
Figure 5:
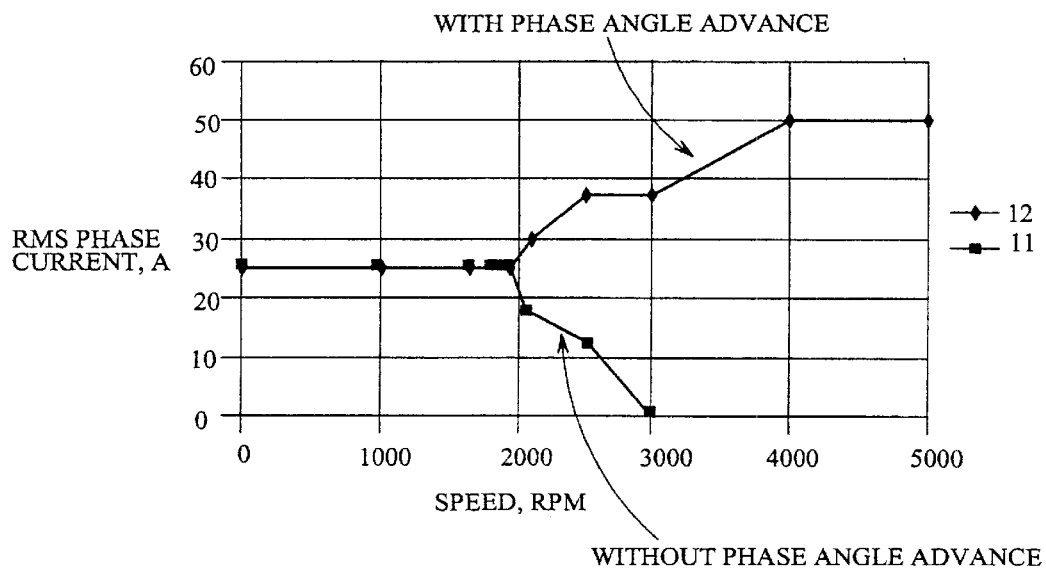
FIG. 5 illustrates phase current vs. speed of a PM motor in voltage mode control.

A 12V, PM motor was simulated using this method over the entire speed range taking the current limit of the machine into account. FIG. 4 shows the torquespeed characteristics at rated conditions while the FIG. 5 shows the current drawn at different speeds with and without phase angle advance of $\delta_1$ described above. Using this method higher torques can be obtained in the extended speed range as compared with the conventional operation. It is possible to optimally design the machine to obtain the required torque-speed characteristics over the entire speed range.

The exemplary embodiment of the invention described herein provides a cost effective torque control method without current sensors over the extended speed range. The control method and controller may be implemented in conjunction with an electric power steering system to control torque generation in the power steering system. The exemplary embodiment of the invention described herein provides numerous advantages. Torque per ampere in the constant torque region below the base speed is maximized by placing the back emf and current signals in phase as shown in FIG. 1. Torque control capability in the extended speed range above the base speed is provided for optimum performance. Low frequency torque due to the use of current sensors is eliminated. This elimination is desirable when the controller is used in connection with a steering column mounted electric power steering system. The controller can be easily implemented in a low cost microcontroller since the mathematical operations involved include only additions and multiplications along with look up tables.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method for torque control of a machine comprising:
   obtaining a torque command signal;
   obtaining a machine speed;
   determining an operating mode in response to the torque command signal and the machine speed, said operating mode including a first operating mode and a second operating mode;
   in the first operating mode, computing a stator phase voltage magnitude and determining an angle between the stator phase voltage and a stator phase back emf in response to the stator phase voltage magnitude;
   in the second operating mode, setting the stator phase voltage to a predetermined magnitude and determining the angle between the stator phase voltage and the stator phase back emf in response to the predetermined magnitude.

2. The method of claim 1 wherein:
   the stator phase voltage magnitude is computed in response to the torque command signal and the machine speed, and
   the angle between the stator phase voltage and the stator phase back emf is determined in response to the torque command signal, the machine speed and the stator phase voltage magnitude.

3. The method of claim 1 wherein:
   the predetermined magnitude is based on a battery voltage; and,
   the angle between the stator phase voltage and the stator phase back emf is determined in response to the torque command signal, the machine speed and the predetermined magnitude.

4. The method of claim 3, wherein
   in the second mode, the angle 6 between the stator phase voltage and the stator phase back emf is determined by iteratively varying the angle 6 until a computed torque value equals or exceeds a demanded torque value.

5. The method of claim 4 wherein the demanded torque value is $$\{T_{cmd}(R^2+X^2)/3Ke)\}+3KeR\omega$$

and the computed torque value is $$V_m \cos \delta + V_m \sin \delta,$$

where
   $T_{cmd}$ is the torque command signal,
   R=the stator resistance
   $X=\omega_e L_a$, the stator phase reactance
   $L_a$=the stator phase inductance
   E=the stator phase back emf
   $\omega_e$=the electrical angular frequency, in rad/s
   $Ke=E/\omega_m$, and
   $V_m$ is a function of the battery voltage.

6. The method of claim 1, wherein said machine is part of a vehicular electric power steering system.

7. The method of claim 1 wherein said machine is a permanent magnet motor.

8. A system for control of torque of a machine, the system comprising:
   a driver coupled to the machine;
   an encoder coupled to a shaft of the machine, the encoder generating a rotation angle signal;
   a controller coupled to an input of the driver and coupled to an output of the encoder, wherein the controller:
   obtains a torque command signal;
   determines a machine speed in response to the rotation angle signal;
   determines an operating mode in response to the torque command signal and the machine speed, said operating mode including a first operating mode and a second operating mode;

in the first operating mode, computing a stator phase voltage magnitude and determining an angle between the stator phase voltage and a stator phase back emf in response to the stator phase voltage magnitude;

in the second operating mode, setting the stator phase voltage to a predetermined magnitude and determining the angle between the stator phase voltage and the stator phase back emf in response to the predetermined magnitude.

9. The system of claim 8 wherein:

the stator phase voltage magnitude is computed in response to the torque command signal and the machine speed, and the angle between the stator phase voltage and the stator phase back emf is determined in response to the torque command signal, the machine speed and the stator phase voltage magnitude.

10. The system of claim 8 wherein:

the predetermined magnitude is based on a battery voltage; and, the angle between the stator phase voltage and the stator phase back emf is determined in response to the torque command signal, the machine speed and the predetermined magnitude.

11. The system of claim 10, wherein in the second mode, the angle $\delta$ between the stator phase voltage and the stator phase back emf is determined by iteratively varying the angle $\delta$ until a computed torque value equals or exceeds a demanded torque value.

12. The system of claim 11 wherein the demanded torque value is $$\{T_{cmd}(R^2+X^2)/3Ke)\}+3KeR\omega$$

and the computed torque value is $$V_m \cos \delta + V_m \sin \delta,$$

where $T_{cmd}$ is the torque command signal,

R=the stator resistance $X=\omega_e L_a$, the stator phase reactance $L_a$=the stator phase inductance E=the stator phase back emf $\omega_e$=the electrical angular frequency, in rad/s $Ke=E/\omega_m$, and $V_m$ is a function of the battery voltage.

13. The system of claim 8, wherein said machine is part of a vehicular electric power steering system.

14. The system of claim 13 wherein said machine is a motor.

15. The system of claim 8 wherein said driver is a PWM inverter.

16. The system of claim 8 wherein said machine is a permanent magnet motor.

* * * * *